(12) United States Patent  (10) Patent No.: US 8,091,269 B2
Orchard                      (45) Date of Patent: Jan. 10, 2012

(54) ELECTROSHOCK WAND FOR AQUATIC CREATURES

(76) Inventor: Stan Orchard, Victoria (CA)

( * ) Notice: Subject to any disclaimer, the term of this patent is extended or adjusted under 35 U.S.C. 154(b) by 386 days.

(21) Appl. No.: 12/172,516

(22) Filed: Jul. 14, 2008

(65) Prior Publication Data

US 2009/0025270 A1    Jan. 29, 2009

(51) Int. Cl.
    *A01K 79/02* (2006.01)
(52) U.S. Cl. ............................................. 43/17.1
(58) Field of Classification Search ................ 43/17.1, 43/98; 119/220; 340/852; 361/232
    See application file for complete search history.

(56) References Cited

U.S. PATENT DOCUMENTS

| | | | | |
|---|---|---|---|---|
| 648,505 A * | 5/1900 | Lindbohm | ...................... | 43/17.1 |
| 1,486,083 A * | 3/1924 | Freer | ............................... | 43/17.1 |
| 1,838,981 A * | 12/1931 | Anderson | ........................ | 43/17.1 |
| 2,163,282 A * | 6/1939 | Hovden | ........................... | 43/17.1 |
| 2,187,400 A * | 1/1940 | Palos | .............................. | 43/17.1 |
| 2,233,045 A * | 2/1941 | Miller et al. | .................... | 43/17.1 |
| 2,238,897 A * | 4/1941 | Gomez | ........................... | 43/17.1 |
| 2,304,065 A * | 12/1942 | Wright | .............................. | 231/7 |
| 2,484,147 A * | 10/1949 | Bartel | .............................. | 231/7 |
| 2,709,984 A * | 6/1955 | Marks | .............................. | 43/17.1 |
| 2,745,205 A * | 5/1956 | Wilhelm | ........................ | 43/17.1 |
| 2,789,383 A * | 4/1957 | Solter | ............................. | 43/17.1 |
| 2,795,883 A * | 6/1957 | Ras | .................................... | 43/17.1 |
| 2,805,067 A * | 9/1957 | Ryan | ................................. | 43/98 |
| 2,808,674 A * | 10/1957 | Vang | ............................... | 43/17.1 |
| 2,818,672 A * | 1/1958 | Kreutzer | ........................ | 43/17.1 |
| 2,903,813 A * | 9/1959 | Gudjohnsen et al. | ........... | 43/17.1 |
| 3,009,278 A * | 11/1961 | Dethloff | .......................... | 43/17.1 |
| 3,058,252 A * | 10/1962 | Matusche | ........................ | 43/17.1 |
| 3,061,966 A * | 11/1962 | Kreutzer | .......................... | 43/17.1 |
| 3,069,797 A * | 12/1962 | Kreutzer | .......................... | 43/17.1 |
| 3,089,274 A * | 5/1963 | Dethloff | .......................... | 43/17.1 |
| 3,235,999 A * | 2/1966 | Wieszeck | ........................ | 43/17.1 |
| 3,305,962 A * | 2/1967 | Abrahamsen et al. | ......... | 43/17.1 |
| 3,324,589 A * | 6/1967 | Soichiro et al. | ................. | 43/17.1 |
| 3,484,665 A * | 12/1969 | Ormsby et al. | ................ | 43/17.1 |
| 3,693,276 A * | 9/1972 | Kurc | ............................... | 43/17.1 |
| 3,775,891 A * | 12/1973 | Holt | ............................... | 43/17.1 |
| 3,777,388 A * | 12/1973 | Newman et al. | ............... | 43/17.1 |
| 4,048,746 A * | 9/1977 | Dye | .................................. | 43/98 |

(Continued)

FOREIGN PATENT DOCUMENTS

DE    4441080 A1 *  4/1995

(Continued)

OTHER PUBLICATIONS

Smith-Root Inc., Telescoping Electrode Pole 4.5-6.5 ft., , 2007.

(Continued)

*Primary Examiner* — Darren W Ark
(74) *Attorney, Agent, or Firm* — Davis & Bujold, P.L.L.C.

(57) ABSTRACT

An electroshock wand for safely and humanely stunning and capturing aquatic creatures is provided. The electroshock wand has a body, an anode member, and a cathode member. The anode and cathode members are attached at or near the electroshock end of the body, with the anode and cathode members being axially spaced from one another. The anode and cathode members create an intense and localized electrical field between one another that momentarily stuns a target organism. The target organism, once stunned may then be collected. This device offers a nonlethal method of capturing invasive species and removing them from specific environments.

4 Claims, 2 Drawing Sheets

U.S. PATENT DOCUMENTS

| | | | | |
|---|---|---|---|---|
| 4,667,431 | A | * | 5/1987 | Mendicino ............................ 43/6 |
| 4,839,980 | A | * | 6/1989 | Hersom ............................ 43/17.1 |
| 5,111,379 | A | * | 5/1992 | Sharber et al. ................. 43/17.1 |
| 5,214,873 | A | * | 6/1993 | Sharber ............................ 43/17.1 |
| 5,233,782 | A | * | 8/1993 | Sharber et al. ................. 43/17.1 |
| 5,270,912 | A | * | 12/1993 | Sharber et al. ................. 43/17.1 |
| 5,311,694 | A | * | 5/1994 | Sharber et al. ................. 43/17.1 |
| 5,327,668 | A | * | 7/1994 | Sharber et al. ................. 43/17.1 |
| 5,406,734 | A | * | 4/1995 | Ho et al. ......................... 43/17.1 |
| 5,417,006 | A | * | 5/1995 | Schettino ......................... 43/17.1 |
| 5,460,123 | A | * | 10/1995 | Kolz ............................ 119/220 |
| 5,551,377 | A | * | 9/1996 | Sharber ............................ 119/220 |
| 5,566,643 | A | * | 10/1996 | Charter et al. ................. 119/220 |
| 5,732,501 | A | * | 3/1998 | Ausburn ......................... 43/17.1 |
| 5,949,636 | A | * | 9/1999 | Johnson et al. .................... 43/98 |
| 6,453,596 | B1 | * | 9/2002 | Marco ............................ 43/17.1 |
| 7,174,668 | B2 | * | 2/2007 | Locklear ......................... 43/17.1 |
| 7,975,425 | B1 | * | 7/2011 | Vanburch et al. ................. 43/17.1 |
| 2006/0168872 | A1 | * | 8/2006 | Locklear ......................... 43/17.1 |

FOREIGN PATENT DOCUMENTS

WO     WO 9637099 A1 * 11/1996

OTHER PUBLICATIONS

Halltech Aquatic Research, "HT-2000 Battery Backpack Electrofisher": http://www.htex.com.

* cited by examiner

ELECTROSHOCK WAND FOR AQUATIC CREATURES

FIELD

The present application relates to a wand that delivers an electrical charge to stun aquatic creatures to facilitate their capture.

BACKGROUND

Backpack electro-shocking or electro-fishing devices have been used in the prior art for stunning and sampling fish. These devices typically impart a series of electrical pulses between an anode and a cathode that momentarily paralyze a fish caught in the electrical field. These devices are designed to allow fish to be stunned without causing any injury to the fish. A fish will typically fully recover from the momentary stun received within moments. An example of such a device can be seen in U.S. Pat. No. 5,327,668.

SUMMARY

There is provided an electroshock wand for aquatic creatures consisting of an elongated body, an anode cable, and a cathode cable. The elongated body has a handling end and an electroshock end. The anode cable extends to an anode member through the body from the handling end to the electroshock end. The cathode cable extends to a cathode member through the body from the handling end to the electroshock end. The cathode member extends outwardly from the body and is axially spaced from the anode member at the electroshock end.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
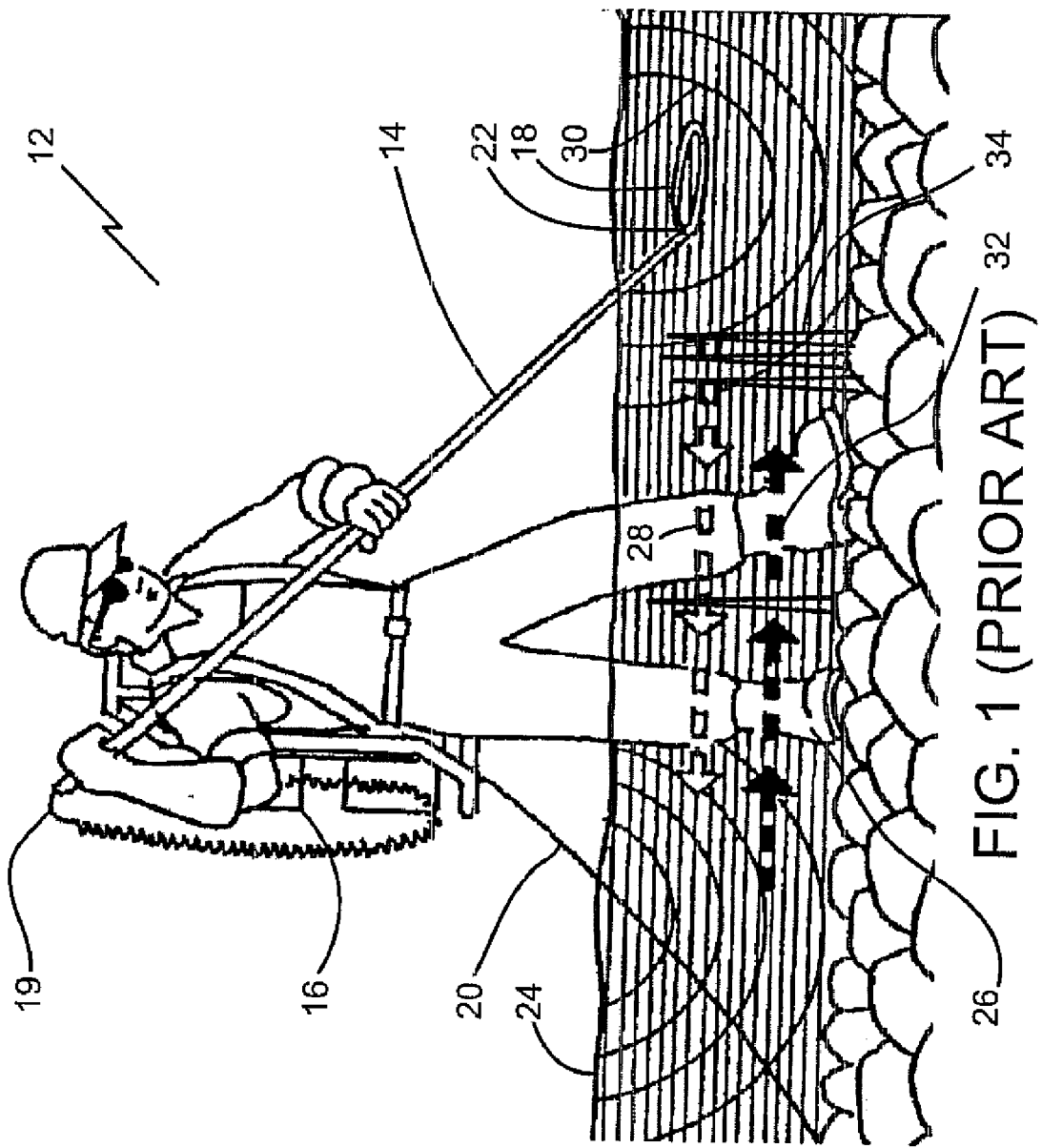
FIG. 1 labeled as PRIOR ART s a side elevation view of a conventional electro-fishing device known in the prior art.

An electroshock wand for aquatic creatures generally identified by reference numeral 10, will now be described with reference to FIG. 1 through 3.

Structure and Relationship of Parts:

Referring to FIG. 1, a conventional electro-fishing device 12 is shown in order to illustrate the principles of electro-shocking. Electro-fishing device 12 consists of a pole 14, a backpack 16, an anode 18 and a cathode 20. Anode 18 is attached to a shocking end 22 of pole 14. Cathode 20 extends downwards from backpack 16, where it enters below a water level 24 around an operator's feet 26. Backpack 16 contains a power source (not shown), which is usually a twenty-four volt battery used to provide electrical energy to electro-fishing device 12. The power source is connected to anode 18 through an anode cable 19. Anode cable 19 runs through pole 14. When electro-fishing device 12 is activated, conventional current 28 flows from anode 18 to cathode 20, creating an electric field 30 that momentarily stuns fish or other wildlife contained within. Arrows 32 illustrate the flow of electrons from the cathode to the anode. Because of the large distance between cathode 20 and anode 18, electric field 30 may be weakened or dispersed by the presence of various obstructions. Typical obstructions in an aquatic environment may include thick aquatic vegetation 34. Because of this weakening, the strength of electrical field 30 may be insufficient to properly stun small aquatic or semi-aquatic creatures (not shown).

Figure 2:
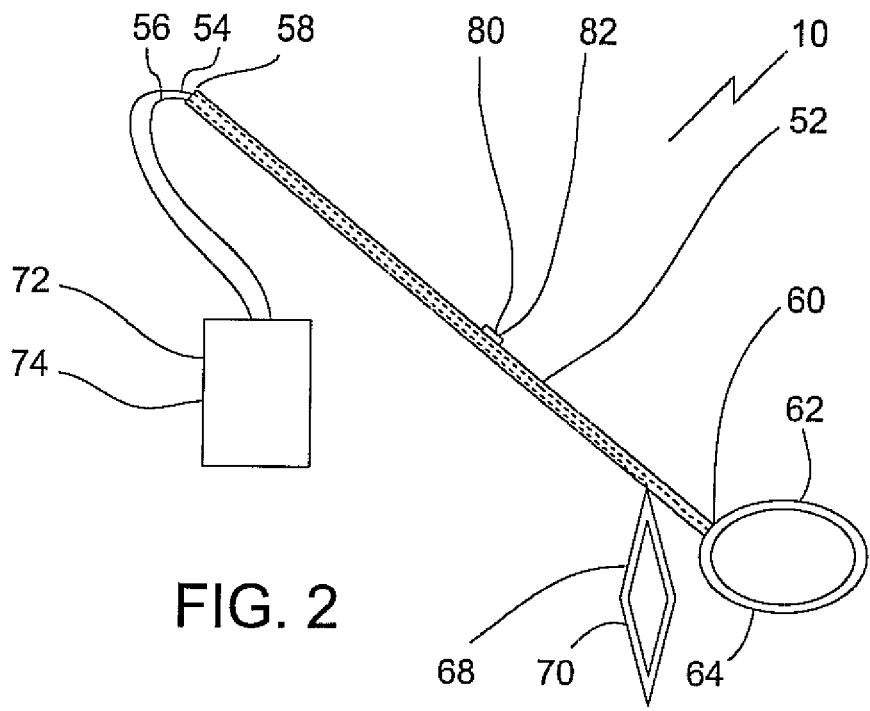
FIG. 2 is a side elevation view, partially in section, of an embodiment of an electroshock wand.

Referring to FIG. 2, electroshock wand 10 has numerous advantages over the prior art. Because anode and cathode members 62 and 68, respectively, of wand 10, are located a much shorter distance apart than anode and cathode 18 and 20, respectively (shown in FIG. 1), of electro-fishing device 12, the electrical field created by a discharge of electrical energy of similar size will be much stronger using electroshock wand 10. The increased strength of electrical field allows wand 10 to be used effectively in environments full of thick vegetation or obstructions where the electrical field of prior art devices is normally reduced below an effective level. In addition, the electrical field created by wand 10 is more localized than one created by electro-fishing device 12 (shown in FIG. 1), allowing wand 10 to deliver a stunning effect to a more specific and accurate area. This ensures that only the organism of interest targeted by wand 10—bullfrog 86 in the example above—is effected by the electroshock imparted by wand 10, leaving adjacent or nearby organisms undisturbed. It also means that less electrical energy per pulse can be used to create the electrical field, allowing battery power to be conserved and runtime to be extended. Furthermore, because the anode and cathode members 62 and 68, respectively are a fixed distance apart, the electrical field between them is more consistent. This means that the electrical energy used per pulse doesn't require much adjusting. This can be contrasted with anode and cathode 18 and 20, respectively (shown in FIG. 1), of electro-fishing device 12, where the distance between anode 18 and cathode 20 can vary depending on how an operator holds pole 14. This means that for electro-fishing device 12 to create a consistent electrical field, either the power used per pulse must be constantly adjusted to compensate for a change in distance between anode 18 and cathode 20, or anode 18 must be manually held (via pole 14) at a certain distance from cathode 20. Finally, because both of anode and cathode members 62 and 68, respectively, are located at electroshock end 60 of wand 10, wand 10 can be used to stun target organisms that are a distance away from operator 78. This can be contrasted with electro-fishing device 12 which can only stun organisms that are near operator's feet 26.

Figure 3:
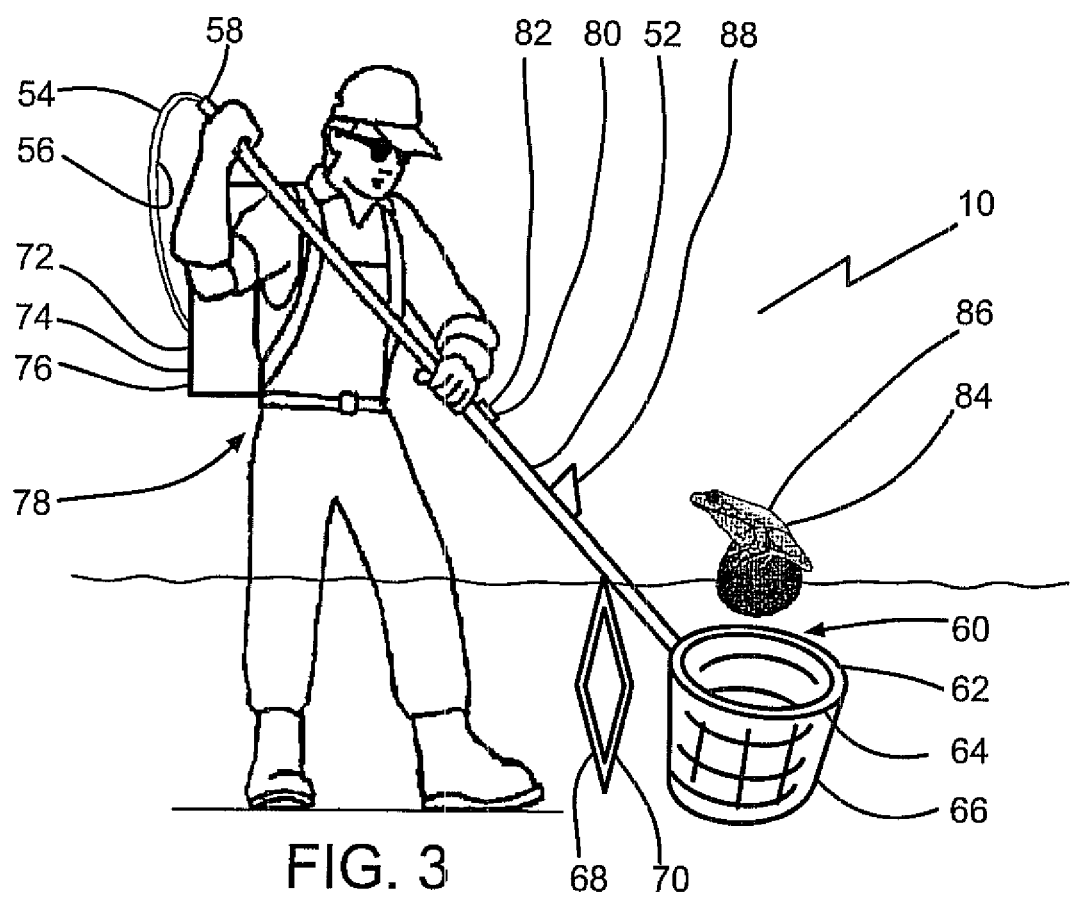
FIG. 3 is a side elevation view of an electroshock wand being used to capture an aquatic creature.

Referring to FIGS. 2 and 3, anode and cathode cables 54 and 56, respectively, exit body 52 from handling end 58, where they may be attached to a power source 72. Anode and cathode cables 54 and 56, respectively, may both be contained within a cable casing (not shown) for ease of use. Power source 72 may be provided in the form of a battery 74. Referring to FIG. 3, Battery 74 may be contained within a backpack 76 to be carried by an operator 78. Battery 74 may be, for example, a twenty-four volt battery known in the art to power electro-shocking devices. Referring to FIGS. 2 and 3, controls 80 may be provided on body 52 that are used to activate or deactivate electroshock wand 10. Alternatively, controls 80 may be provided as a part of a unit (not shown) separate to body 52, such as a hand-held device (not shown), or as part of backpack 76. In addition to activating/deactivating wand 10, controls 80 may also control various parameters of wand 10. Examples of such parameters include the intensity or pulse rate of the bursts of electrical energy released from wand 10. In the embodiments shown in FIGS. 2 and 3, controls 80 are provided as a switch 82.

Electroshock wand 10 may be provided as a standalone unit as shown in FIG. 3, or as an addition to an existing electro-shocker unit (not shown). Electroshock wand 10 may also be created by modifying existing electro-shocking equipment, such as electro-fishing device 12 shown in FIG. 1.

Operation:

Referring to FIG. 3, electroshock wand 10 is being used to stun and capture an aquatic creature 84. Aquatic creature 84 is shown as a bullfrog 86. The example of bullfrog 86 is intended for illustration only and it should be understood that wand 10 may be used in a similar fashion to stun and capture any type of aquatic or semi-aquatic animal.

Bullfrog 86 is first visually spotted and identified by operator 78. Operator 78 then cautiously approaches bullfrog 86. Anode member 62 is then positioned underneath or adjacent bullfrog 84 with cathode member 68 extending into the water. Controls 80 are used to activate an electroshock between anode member 62 and cathode member 68. When electroshock wand 10 is activated, an electrical field (not shown) is created in the water within the vicinity of cathode and anode members 68 and 62, respectively that momentarily stuns bullfrog 86. A typical electrical stun will stun bullfrog 86 for a period of thirty to sixty seconds, during which bullfrog 86 can be collected safely. Wand 10 may be deactivated before collection and after stunning bullfrog 86. Bullfrog 86 may be collected by scooping bullfrog 86 out of the water using closed end net 66. Alternatively, other methods of collecting bullfrog 86 may be used, including using a separate net (not shown) or an assistant's hands (not shown). Because the electroshock received by bullfrog 86 is only enough to stun, no damage is done to bullfrog 86 and it is able to fully recover from the effects of the electroshock within moments. In this way, electroshock wand 10 may be used as a humane and non-lethal means of capturing specific species of animals.

It may be advantageous to use wand 10 to capture aquatic creatures 84 of interest at night, using a light source 88 with wand 10. Many aquatic creatures 84 may be nocturnal, and therefore more accessible at night. Light source 88 would be used to aid with visually spotting and identifying the target species.

Advantages:

Referring to FIG. 2, electroshock wand 10 has numerous advantages over the prior art. Because anode and cathode members 62 and 68, respectively, of wand 10, are located a much shorter distance apart than anode and cathode 18 and 20, respectively (shown in FIG. 1), of electro-fishing device 12, the electrical field created by a discharge of electrical energy of similar size will be much stronger using electroshock wand 10. The increased strength of electrical field allows wand 10 to be used effectively in environments fill of thick vegetation or obstructions where the electrical field of prior art devices is normally reduced below an effective level. In addition, the electrical field created by wand 10 is more localized than one created by electro-fishing device 12 (shown in FIG. 1), allowing wand 10 to deliver a stunning effect to a more specific and accurate area. This ensures that only the organism of interest targeted by wand 10—bullfrog 86 in the example above—is effected by the electroshock imparted by wand 10, leaving adjacent or nearby organisms undisturbed. It also means that less electrical energy per pulse can be used to create the electrical field, allowing battery power to be conserved and runtime to be extended. Furthermore, because the anode and cathode members 62 and 68, respectively are a fixed distance apart, the electrical field between them is more consistent. This means that the electrical energy used per pulse doesn't require much adjusting. This can be contrasted with anode and cathode 18 and 20, respectively (shown in FIG. 1), of electro-fishing device 12, where the distance between anode 18 and cathode 20 can vary depending on how an operator holds pole 14. This means that for electro-fishing device 12 to create a consistent electrical field, either the power used per pulse must be constantly adjusted to compensate for a change in distance between anode 18 and cathode 20, or anode 18 must be manually held (via pole 14) at a certain distance from cathode 20. Finally, because both of anode and cathode members 62 and 68, respectively, are located at electroshock end 60 of wand 10, wand 10 can be used to stun target organisms that are a distance away from operator 78. This can be contrasted with electro-fishing device 12 which can only stun organisms that are near operator's feet 26.

In this patent document the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the claims.

What is claimed is:

1. An electroshock wand for aquatic creatures, comprising:
    an elongated body having a handling end, an electroshock end and defining a longitudinal axis therebetween, and the elongated body being a pole;
    an anode cable extending through the body from the handling end to the electroshock end to an anode member rigidly secured to and extending forwardly from the electroshock end of the body;
    a cathode cable extending through the body from the handling end to the electroshock end to a cathode member rigidly secured to the body and spaced inwardly from the electroshock end such that an end of the cathode cable is located between the handling end and the electroshock end; and
    the anode member is an anode frame defining an anode perimeter about an anode space therewithin and the cathode member is a cathode frame defining a cathode perimeter about a cathode space therewithin, with the cathode frame extending outwardly away from the longitudinal axis of the body and being axially spaced relative to the longitudinal axis of the body from the anode frame at the electroshock end to establish a non-contact electrical stunning field.

2. The electroshock wand of claim 1, wherein the anode frame supports a closed net.

3. The electroshock wand of claim 1, wherein the anode frame is a ring.

4. The electroshock wand of claim 1, wherein the cathode frame is diamond-shaped.

* * * * *